(12) United States Patent
Gelles

(10) Patent No.: US 6,222,008 B1
(45) Date of Patent: Apr. 24, 2001

(54) TREATMENT OF POLYMER SOLUTION WITH ACID AND AMMONIA TO IMPROVE POLYMER COLOR

(75) Inventor: Richard Gelles, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/518,437

(22) Filed: Mar. 2, 2000

Related U.S. Application Data

(60) Provisional application No. 60/132,903, filed on May 6, 1999.

(51) Int. Cl.[7] ............................................... C08F 6/00
(52) U.S. Cl. ................................................. 528/480
(58) Field of Search ................................................. 528/480

(56) References Cited

U.S. PATENT DOCUMENTS

| 2,063,158 | * | 12/1936 | Greenehwalt | 528/196 |
| 4,028,485 |   | 6/1977  | Poloso et al. | 528/486 |
| 4,098,991 |   | 7/1978  | Kang | 528/492 |
| 4,207,409 | * | 6/1980  | Ladenberger et al. | 525/338 |
| 4,278,506 |   | 7/1981  | Irvin | 203/68 |
| 4,471,099 |   | 9/1984  | Trepka | 525/338 |
| 4,595,749 |   | 6/1986  | Hoxmeier | 528/483 |
| 4,970,265 | * | 11/1990 | Willis | 525/332.9 |
| 5,281,696 | * | 1/1994  | Gibler | 528/485 |

FOREIGN PATENT DOCUMENTS

| 2748884       | * | 3/1979 | (DE) . |           |
| 0 387 671 A1  | * | 9/1990 | (EP) ................................ C08F/2/42 |
| 1 067 482     | * | 5/1967 | (GB) ................................ C08F/1/88 |
| 2 295 154     | * | 5/1996 | (GB) ................................ C08F/8/04 |
| WO 99/05185   | * | 2/1999 | (WO) ............................... C08F/8/04 |
| WO 00/12570   | * | 3/2000 | (WO) ............................... C08F/6/08 |

OTHER PUBLICATIONS

International Search Report dated Dec. 10, 2000.*

* cited by examiner

Primary Examiner—Terressa M. Boykin
(74) Attorney, Agent, or Firm—Donald F. Haas

(57) ABSTRACT

This invention is a process comprising the steps of contacting an alkali metal initiator and Group VIII metal hydrogenation catalyst residue containing polymer solution (which is often referred to as the polymer cement) with water and carbon dioxide or an aqueous solution of an inorganic acid such as phosphoric or sulfuric acid and further contacting the solution with ammonia wherein at least one mole of both water and carbon dioxide are added per mole of alkali metal, or at least one mole of acidic protons from the inorganic acid is added per mole of alkali metal, the water or the aqueous acid solution are added at less than 15 percent by weight based on the polymer solution in order to prevent fast settling, and ammonia is added so that the pH of the aqueous phase is between 9 and 12.

6 Claims, No Drawings

TREATMENT OF POLYMER SOLUTION WITH ACID AND AMMONIA TO IMPROVE POLYMER COLOR

This application claims the benefit of U.S. Provisional Application No. 60/132,903, filed May 6, 1999, the entire disclosure of which is hereby incorporated by reference.

FIELD OF THE INVENTION

This invention relates to a process to prepare hydrogenated polymers with improved color. More particularly, the invention relates to the treatment of lithium-initiated anionic polymers which are hydrogenated with cobalt carboxylate hydrogenation catalysts to neutralize lithium residues that are a cause of poor polymer color.

BACKGROUND OF THE INVENTION

The uses of alkali metal-initiated anionic polymeric materials, including diolefin polymers, continue to grow rapidly in such diverse areas as protective paint coverings, wire insulations, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultraviolet degradation. Polymer hydrogenation processes have therefore been studied for many years as a method to prepare novel materials with excellent stability and other desirable properties. Early polymer hydrogenation processes utilized heterogeneous catalysts which were known to be useful for hydrogenation of low molecular weight olefins and aromatics. These catalyst systems included catalysts such as nickel on kieselguhr. A fine catalyst powder was preferred and large amounts of catalysts were required to complete the hydrogenation in a reasonable time. Such processes were only partially successful, since the reaction requires the diffusion of the polymer molecules into the pores of the catalyst, where the active nickel metal is present. This is a slow process when hydrogenating polymers.

Discovery of Group VIII metal, especially cobalt carboxylate and nickel 2-ethyl-1-hexanoate/triethyl aluminum, hydrogenation catalyst systems enabled rapid hydrogenation of polymers. These processes utilize the catalyst as a colloidal suspension in polymer containing solutions. This type of catalyst is referred to as a homogeneous catalyst. Such a process has been used for a number of years to prepare hydrogenated isoprene-styrene block copolymers that are used as viscosity index improvers in premium motor oils. U.S. Pat. No. 3,554,991 describes an exemplary process. Besides cobalt and nickel, Group VIII metals in general will function as the active metal in these systems, and in particular, iron, and palladium are known to be acceptable.

Pore diffusion is not a limitation when homogeneous catalysts are utilized. The hydrogenation process is rapid and complete in a matter of minutes. However, removal of the catalyst from the polymer product is necessary because metals, particularly nickel, which remain with the polymer catalyze degradation of the polymer product. Furthermore, the alkali metal residue, usually lithium, can also cause problems, especially color problems, in the polymer. The removal of the alkali metal initiator and catalyst from the polymer solution is commonly accomplished by the addition of an acidic aqueous solution and air to oxidize the nickel to a divalent state. The nickel and aluminum salts are soluble in the aqueous phase and can then be removed from the hydrogenated polymer solution by separation of the aqueous phase.

Alternative methods to remove hydrogenation catalyst residues from solutions of hydrogenated polymers include treatment with dicarboxylic acid and an oxidant, as disclosed in U.S. Pat. No. 4,595,749; treatment with an amine compound wherein the amine is either a chloride salt or a diamine having an alkyl group of 1 to 12 carbon atoms as disclosed by U.S. Pat. No. 4,098,991; and treatment with a non-aqueous acid followed by neutralization with an anhydrous base and filtration, as to disclosed by U.S. Pat. No. 4,028,485. These processes involve contacting the polymer solution with compounds that contaminate the polymer. Further process steps can be required to remove these contaminants. U.S. Pat. Nos. 4,278,506 and 4,471,099 describe processes to remove such contaminants from hydrogenated polymer solutions. Some of these catalyst removal systems are undesirable because the processes require relatively expensive metallurgy due to the corrosive nature of the compounds. Many also require the consumption of a continuous stream of reactants and produce sludge containing the catalyst and residues of the treatment chemicals.

The above-described processes have the disadvantage that they require process steps such as settling and filtration which separate the catalyst residue. Steps like settling and filtration can be quite expensive in terms of capital investment and time. Thus there is a need for a method which produces stable polymer with good color and which does not require these expensive process steps. The present invention provides a method for producing stable polymer with good color which involves neutralizing the alkali metal initiator rather than removing the catalyst residue from the polymer.

SUMMARY OF THE INVENTION

This invention is a process comprising the steps of contacting an alkali metal initiator and Group VIII metal hydrogenation catalyst residue containing polymer solution (which is often referred to as the polymer cement) with water and carbon dioxide or an aqueous solution of an inorganic acid such as phosphoric or sulfuric acid and further contacting the solution with ammonia wherein at least one mole of both water and carbon dioxide are added per mole of alkali metal, or at least one mole of acidic protons from the inorganic acid is added per mole of alkali metal, the water or the aqueous acid solution are added at less than 15 percent by weight based on the polymer solution in order to prevent fast settling, and ammonia is added so that the pH of the aqueous phase is between 9 and 12.

DETAILED DESCRIPTION OF THE INVENTION

The polymer solutions of the present invention preferably comprise from 1 to about 50 percent by weight of a polymer, and more preferably comprise from about 5 to about 40 percent by weight of polymer based on the total amount of solution. The polymer is a partially, selectively, or totally hydrogenated polymer. The present invention does not depend upon the type of nature of the polymer. The polymer may therefore be a thermoplastic polymer or an elastomeric polymer and may have a molecular weight which varies between wide limits. Most typically, polymers which are benefited by hydrogenation are those comprising polymerized conjugated diolefins. These conjugated diolefin-containing polymers are therefore preferred for the practice of the present invention. They may be prepared by radical, anionic or cationic polymerization and may be copolymers with other monomer units. The copolymers may be random, block, or tapered, and may have structures that are linear, branched, radial or star.

In a most preferred embodiment, the polymer is an anionically polymerized conjugated diolefin polymer which was anionically polymerized in an inert solvent and then hydrogenated in the same solvent to form the alkali metal and hydrogenation catalyst residue containing polymer solution. The preferred polymers in this invention are block copolymers of styrene and a conjugated diene, especially butadiene or isoprene.

When an anionic initiator is used, polymers will be prepared by contacting the monomers with an organoalkali metal compound in a suitable solvent at a temperature within the range from about −100° C. to about 300° C., preferably at a temperature within the range from about 0° C. to about 100° C. Particularly effective polymerization initiators are organolithium compounds having the general formula:

$$RLi_n$$

wherein R is an aliphatic, cycloaliphatic or aromatic hydrocarbon radical having from one to about 20 carbon atoms; and n is an integer from 1 to 4.

The polymer of the present invention is contacted with hydrogenation catalyst and hydrogen in a solution with an inert solvent such as cyclohexane, normal hexane, diethyl ether, toluene or benzene. The hydrogenation catalysts themselves have complex structures that are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("cocatalyst"). The preparation of such catalysts is taught in U.S. Pat. Nos. 3,591,064 and 4,028,485, which are incorporated herein by reference.

The catalyst metals which are preferred include iron, cobalt, nickel and palladium. Nickel and cobalt are particularly preferred. Aluminum is the preferred cocatalyst metal due to the excellent activity of the resulting cocatalyst. The preferred catalyst for use herein is a cobalt carboxylate, most preferably a neodecanoate aluminum triethyl catalyst.

The present invention provides two methods for treating the hydrogenated polymer to neutralize the impurities which adversely affect the color of the polymer. The first method involves first treating the hydrogenated polymer cement with water in an amount from about 1 mole per mole of alkali metal to 15 percent by weight based on the polymer cement and then contacting the so-treated cement with carbon dioxide. The contact with carbon dioxide is usually carried out by bubbling carbon dioxide gas through the water-treated cement, usually in an amount of at least 1 mole of $CO_2$ per mole of alkali metal. This step is generally carried out at a temperature of from 50 to 100° C.

In the other method, the first part of the process is different from the above in that the hydrogenated polymer cement is contacted with at least one mole of acidic protons from an inorganic acid per mole of alkali metal. Inorganic acids such as phosphoric and sulfuric acid have two acidic protons per molecule while an acid such as hydrochloric acid has one acidic proton. The inorganic acid can be diluted with water to form an aqueous solution. Up to 15 percent by weight based on the polymer cement of this aqueous solution can be added to the cement to prevent easy settling out of the solution. The concentration of the acid solution generally ranges from 0.01 to 10 percent by weight of inorganic acid in water. This step is generally carried out at a temperature from 50 to 100° C.

In both alternatives, the next step of the process is contacting the so-treated polymer cement with ammonia. The ammonia is generally contacted with the polymer cement by bubbling gaseous ammonia through the cement but this step may also be carried out by adding an aqueous solution of ammonia, e.g., an ammonium hydroxide solution. Generally enough ammonia should be used so that the pH of the aqueous phase is between 9 and 12.

Excess ammonia and carbon dioxide remaining in the polymer cement will be volatized during the finishing of the polymer subsequent to the treatment step.

EXAMPLES

Feeds

The polymer/cyclohexane cements used are described in the table. They are lithium initiated anionic styrene-butadiene-styrene block copolymer cements that have been hydrogenated with a cobalt/aluminum catalyst. The different feed designations are given in footnote E.

Equipment and Procedures

The experiments and results are described in the table.

The cements were treated in a four liter extractor with two flat blade impellers each with six blades. 3000 ml of cement were added to the extractor and heated to 75° C. under nitrogen. Phosphoric acid and sulfuric acid were diluted to 1% wt in deionized water and these solutions were added to the top of the extractor and mixed with cement in the phosphoric acid/sulfuric acid experiments. A 3% volume oxygen/97% nitrogen gas mixture was added to the extractor at a rate of 250 ml/min while venting and using a regulator to keep pressure at 25 psig. Mixing was carried out for 60 minutes. After sixty minutes a sample of the cement was removed from the extractor and centrifuged. The pH of the centrifuged out aqueous phase was measured.

The $H_2O$/carbon dioxide experiments were done in an identical manner as phosphoric acid/sulfuric acid experiments except water was first added to the top of the extractor and mixed with the cement, and then a 0.5% oxygen/88.5% carbon dioxide/11% nitrogen gas mixture was added.

Gaseous ammonia was then added to the extractor at 250 ml/min for 1.5 minutes while venting and using a regulator to keep pressure in the extractor at 25 psig. The cement was mixed for an additional 13.5 minutes. After the ammonia treatment, a sample of cement was removed from the extractor and centrifuged. The pH of the centrifuged out aqueous phase was measured.

The extractor was then vented and its contents put under nitrogen. Irganox 1010, in a 2% wt solution in cyclohexane, was then added to the cement at 0.1% wt on polymer. The polymer was then recovered from the cement by hot water coagulation, and was then dried in a vacuum oven at 50° C. under nitrogen.

Cements were analyzed for Co by either plasma scan elemental analysis or by atomic absorption, and for Li by ion chromatography. pH was determined with either pH paper or pH meter. Dried crumbs of the medium molecular weight polymer were pressed for a total of ten minutes at 220° C. in order to prepare plaques for yellowness index (YI) measurement. Plaques were aged in an air circulating oven for one hour at 200° C. YI was measured with a Gardner Model 2000/05 calorimeter following ASTM D1925.

Dried crumb of the high molecular weight polymer was first compounded in a small Brabender mixer before pressing plaques. A formulation was used of 100 parts by weight polymer, 34 parts polypropylene homopolymer, 100 parts Drakeol 34, 0.2 parts Irganox 1010, and 0.5 parts dilauryl thiodipropionate (DLTDP).

Results

Results are given in the attached spreadsheet. Runs 2406, 2412, 2443, and 2447 are comparative examples which gave polymers with poor color. All other runs are illustrative of the claimed invention and gave polymer with good unaged and aged color.

Run 2406, in which the cement was not treated with either acid or $H_2O$/carbon dioxide, gave polymer with the worst color. In run 2412, an insufficient amount of acid was added to the cement. This is apparent from the pH value of the centrifuged out aqueous phase which is 14 both after acid and ammonia treatments. Run 2412 gave polymer with poor initial and aged color. It is believed that LiOMe, present from polymer termination with methanol, is a strong enough base which can catalyze hydrolysis of the antioxidant to colored species.

In runs 2443 and 2447, the cement was not treated with ammonia. The polymers made in runs 2443 and 2447, without ammonia, had good initial color but poor aged color. It is believed that an excess of acid or water/carbon dioxide in the cement can lead to acid catalyzed hydrolysis of the antioxidant to colored species.

In runs 2422, 2424, 2426, 2428, 2430, 2410, 2414, 2418, 2408, 2449, 2445, 2451 an excess of inorganic acid or water/carbon dioxide was added to the cement compared to the stoichiometric amount that was necessary to react with Li from the termination agent and both Co and Al from the hydrogenation catalyst. In addition ammonia was added to the cements in these runs. These runs all gave polymer with good unaged and aged color.

a) treating a solution of the alkali metal and Group VIII metal hydrogenation catalyst residue containing polymer with water and carbon dioxide;

b) contacting the treated solution with ammonia; and c) devolatilizing the solution while recovering the anionic polymer without removing the alkali metal and the Group VIII metal hydrogenation catalyst.

2. The process of claim 1 wherein the amount of water used in step a) is from 1 mole per mole of alkali metal up to 15 percent by weight based on the polymer solution, the amount of carbon dioxide used is at least 1 mole per mole of alkali metal, and the amount of ammonia used is sufficient so that the pH of the aqueous phase is from 9 to 12.

3. The process of claim 2 wherein the alkali metal is lithium and the Group VIII metal is cobalt.

4. A process to improve the color of an anionic polymer that has been initiated with an alkali metal initiator and hydrogenated with a Group VIII metal hydrogenation catalyst which comprises:

a) treating a solution of the alkali metal and Group VIII metal hydrogenation catalyst residue containing polymer with an aqueous solution of an inorganic acid;

b) contacting the treated solution with ammonia; and c) devolatilizing the solution while recovering the anionic polymer without removing the alkali metal and the Group VIII metal hydrogenation catalyst.

5. The process of claim 4 wherein the amount of acid solution used is such that at least one mole of acidic protons from the inorganic acid is added per mole of alkali metal, the aqueous acid solution is used at up to 15 percent by weight

| RUN | FEED (E) | ACID | PPM ACID (A) | NH3 | PH AFTER ACID | PH AFTER NH3 | YI (B) | AGED YI |
|---|---|---|---|---|---|---|---|---|
| RUNS WITH COBALT HYDROGENATED MEDIUM MW SEBS | | | | | | | | |
| 2406 | 6129A | NONE | NONE | NO | NOT APPLICABLE | NOT APPLICABLE | 51 | 98 |
| 2422 | 6309B | H3PO4 | 210 | YES | 7 | 11 | 5 | 7 |
| 2424 | 6309B | H3PO4 | 260 | YES | 7 | 10 | 5 | 7 |
| 2426 | 6309B | H3PO4 | 360 | YES | 6 | 11 | 6 | 8 |
| 2430 | 6309B | H3PO4 | 420 | YES | 3 | 10 | 4 | 7 |
| 2428 | 6309B | H3PO4 | 500 | YES | 2 | 10 | 4 | 8 |
| 2412 | 6129A | H2SO4 | 100 | YES | 14 | 14 | 21 | 28 |
| 2410 | 6129A | H2SO4 | 220 | YES | 0 | 10 | 6 | 9 |
| 2414 | 6129A | H2SO4 | 220 | YES | NOT MEASURED | NOT MEASURED | 7 | 8 |
| 2418 | 6309B | H2SO4 | 250 | YES | 3 | 11 | 7 | 11 |
| 2408 | 6129A | H2SO4 | 300 | YES | 0 | 10 | 7 | 10 |
| RUNS WITH COBALT HYDROGENATED HIGH MW SEBS | | | | | | | | |
| 2443 | 6369C | H3PO4 | 70 | NO(C) | 7 | 7(D) | 6 | 27 |
| 2449 | 6369C | H3PO4 | 162 | YES | 3 | 10 | 4 | 14 |
| 2445 | 6369C | H2O/CO2 | 70 | YES | NOT MEASURED | NOT MEASURED | 10 | 14 |
| 2451 | 6369C | H2O/CO2 | 20,000 | YES | 8 | 11 | 6 | 12 |
| 2447 | 6369C | H2O/CO2 | 20,000 | NO | 8 | NOT APPLICABLE | 7 | 26 |

(A) - FOR H2O/CO2, PPM H2O IS GIVEN IN THIS COLUMN.
(B) - YELLOWNESS INDEX FOR HIGH MWT SEBS IS FOR COMPOUNDED POLYMER.
(C, D) - PH MEASURED SHOWED THAT WE NEGLECTED TO ADD NH3 FOR THIS RUN.
(E) FEEDS

| FEED | SOLIDS | POLYMER PSC, % | POLYMER MW, Ms $\times 10^{-3}$ | CO, PPM | LI, PPM |
|---|---|---|---|---|---|
| 6129A | 17.5 | 30 | 110 | 3.5 | 22 |
| 6309B | 20.1 | 30 | 110 | 4 | 25 |
| 6369C | 10 | 33 | 290 | 3 | 6 |

I claim:

1. A process to improve the color of an anionic polymer that has been initiated with an alkali metal initiator and hydrogenated with a Group VIII metal hydrogenation catalyst which comprises:

based on the polymer solution, and ammonia is added so that the pH of the aqueous phase is between 9 and 12.

6. The process of claim 5 wherein the alkali metal is lithium and the Group VIII metal is cobalt.

* * * * *